US012541471B2

(12) United States Patent
Shamim et al.

(10) Patent No.: US 12,541,471 B2
(45) Date of Patent: Feb. 3, 2026

(54) COORDINATED SET PERIPHERAL DEVICE PAIRING AND CONNECTION MANAGEMENT

(71) Applicant: Microsoft Technology Licensing, LLC, Redmond, WA (US)

(72) Inventors: Sharib Shamim, Karnataka (IN); Raamish Malik, Karnataka (IN); Sidhi Lohia, Haryana (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/629,137

(22) Filed: Apr. 8, 2024

(65) Prior Publication Data
US 2025/0315388 A1    Oct. 9, 2025

(51) Int. Cl.
*G06F 13/10* (2006.01)
(52) U.S. Cl.
CPC .................... *G06F 13/10* (2013.01)
(58) Field of Classification Search
CPC ....................................... G06F 13/10
See application file for complete search history.

(56) References Cited

U.S. PATENT DOCUMENTS

| | | | |
|---|---|---|---|
| 2018/0011772 A1* | 1/2018 | Meyer | G06F 13/385 |
| 2019/0327243 A1* | 10/2019 | Kocemba | H04L 63/104 |
| 2021/0014613 A1* | 1/2021 | Carrigan | H04R 1/1041 |
| 2021/0398551 A1* | 12/2021 | Nandy | G10L 15/16 |
| 2023/0336412 A1* | 10/2023 | Kannan | H04L 63/102 |

* cited by examiner

*Primary Examiner* — Zachary K Huson (57) ABSTRACT

A system and method for providing coordinated set peripheral device pairing and connection management. Pairing a peripheral device to a host device typically involves presenting an option to a user to consent to connecting a discovered device to the host device. In examples, prior to presenting a connect option, a pairing service obtains product-specific details about the discovered peripheral device and determines whether the device is part of a coordinated set. The details are collected and stored in a local and/or cloud catalog from host devices and/or an original equipment manufacturer of the peripheral device. When the discovered device is determined as a coordinated set, various user interface elements, including a multi-member connect option, are presented to the user. Selection of the multi-member connect option provides consent from the user to connect to all or a subset of the set members via a single user interaction.

20 Claims, 8 Drawing Sheets

COORDINATED SET PERIPHERAL DEVICE PAIRING AND CONNECTION MANAGEMENT

BACKGROUND

Typically, a peripheral device is paired for wireless connectivity with a host device before it can be used. Current schemes for pairing a peripheral device commonly involve one or more peripheral devices within range being presented to a user on the host device. A user may identify their peripheral device and select a connect option to initiate pairing (e.g., where secrets are exchanged between the host device and the selected peripheral device) and connection to the peripheral device.

In some examples, the peripheral device is a member of a coordinated set of devices configured to support a specific scenario, referred to herein as a coordinated set peripheral device (e.g., a pair of hearing aids, a pair of earbuds, a speaker set, a group of sensor nodes). In further examples, identification of a peripheral device as a coordinated set device is enabled after connection to at least one set member of the coordinated set peripheral device. Thus, multiple connect options are presented in association with pairing the coordinated set peripheral device to connect all members of the set (e.g., a first connect option corresponding to the first set member and a second connect option corresponding to an additional set member of the coordinated set peripheral device).

It is with respect to these and other considerations that examples have been made. In addition, although relatively specific problems have been discussed, it should be understood that the examples should not be limited to solving the specific problems identified in the background.

SUMMARY

The technology described herein provides coordinated set peripheral device pairing and connection management. A pairing service on a host device is in communication with a cloud-based catalog that collects, stores, and provides product—(e.g., make and model) specific peripheral device details to the host device. Based on the details, the pairing service is able to determine, prior to pairing, whether a discovered peripheral device is a set member of a coordinated set peripheral device. When the discovered device is determined to be a coordinated set peripheral device, a multi-member connect option is presented to the user. The multi-member connect option allows the user to consent to connecting all or a subset of the set members of the coordinated set peripheral device via a single user interaction. In some examples, the stored peripheral device details include additional information about the coordinated set peripheral device that can be presented as cues to the user, such as a product-specific image or icon representing the coordinated set peripheral device. In further examples, the stored peripheral device details include a link to a companion application or service associated with the peripheral device. The link can be presented to the user for downloading or opening the companion application for accessing additional features or functionality for the peripheral device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example by the accompanying figures, in which like references indicate similar elements. Elements in the figures are illustrated for simplicity and clarity and have not necessarily been drawn to scale.

DETAILED DESCRIPTION

The following detailed description refers to the accompanying drawings. Wherever possible, the same reference numbers are used in the drawing and the following description to refer to the same or similar elements. While aspects of the technology may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the technology, but instead, the proper scope of the technology is defined by the appended claims. Examples may take the form of a hardware implementation, or an entirely software implementation, or an implementation combining software and hardware aspects. The following detailed description is, therefore, not to be taken in a limiting sense.

Examples described in this disclosure relate to systems and methods for providing coordinated set peripheral device pairing and connection management. Currently, identification of a peripheral device as a coordinated set device is enabled after connection to at least one set member of the coordinated set peripheral device. Thus, multiple connect options are presented in association with pairing the coordinated set peripheral device to connect all members of the set. User confusion is likely to occur when multiple user interactions with connect options are required to pair all set members of the coordinated set peripheral device, such as when there may exist an expectation to pair all set members of the coordinated set peripheral device together.

Examples of the present disclosure include a pairing service in communication with a cloud-based catalog that stores product—(e.g., make and model) specific peripheral device details that are used by a host device to determine, prior to connection to a discovered peripheral device, whether it is a set member of a coordinated set peripheral device. When the device is determined to be a coordinated set peripheral device, a multi-member connect option is presented to the user. In some examples, the multi-member connect option corresponds to all discovered set members of the coordinated set peripheral device. In other examples, the multi-member connect option corresponds to a subset of the discovered set members. A selection of the multi-member connect option represents user consent to connect to the desired set members via a single user interaction. In addition to requiring fewer processing steps to process user interactions to pair the coordinated set peripheral device, the single user interaction reduces user confusion to connect multiple set members. In some examples, the stored peripheral device details include additional information (e.g., a make and model-specific image or icon representing about the coordinated set peripheral device) that can be presented. The additional information further reduces confusion and increases connection security by ensuring the intended peripheral device and set members are selected for connection.

Figure 1:
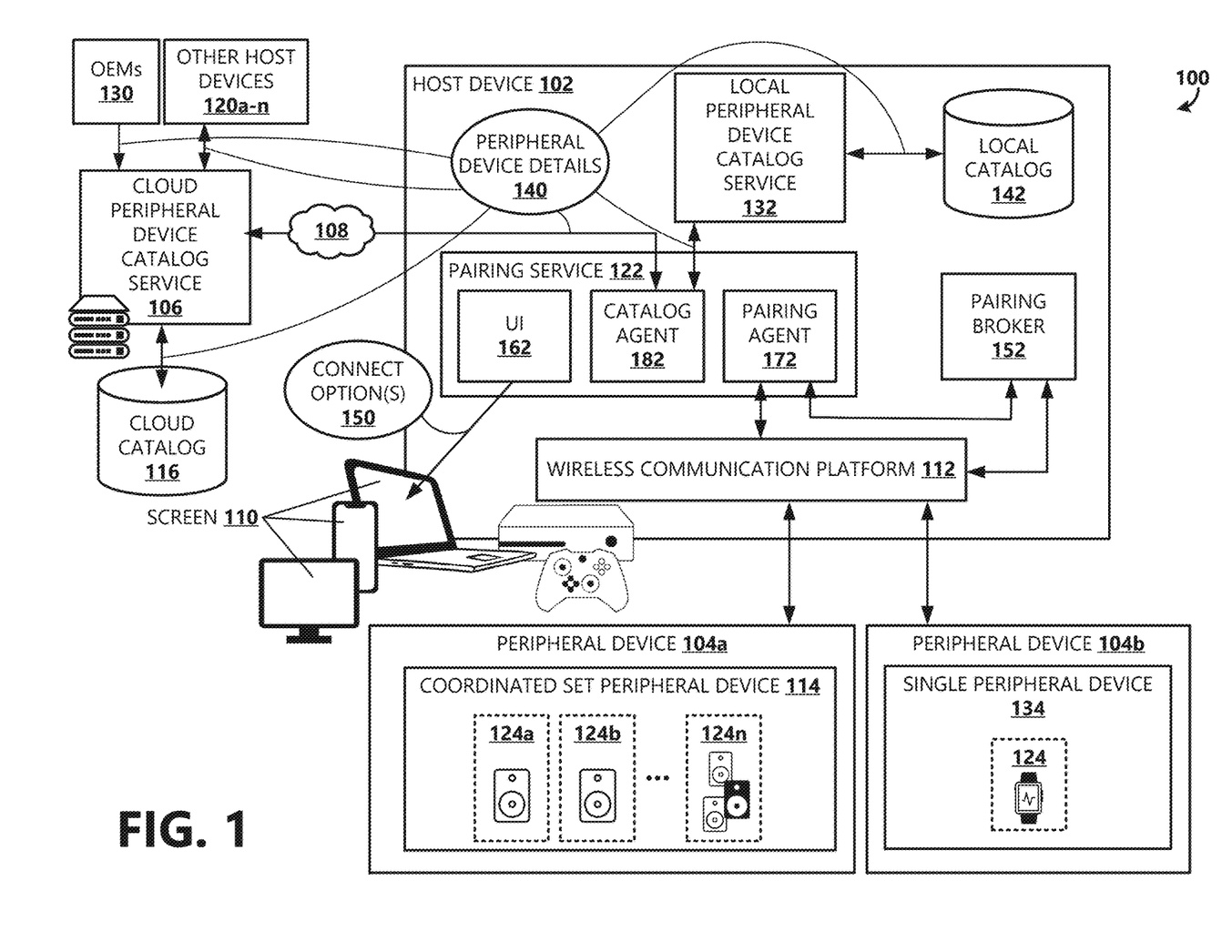
FIG. 1 is a block diagram of an example system for providing coordinated set peripheral device pairing and connection management according to an aspect.
Figure 8:
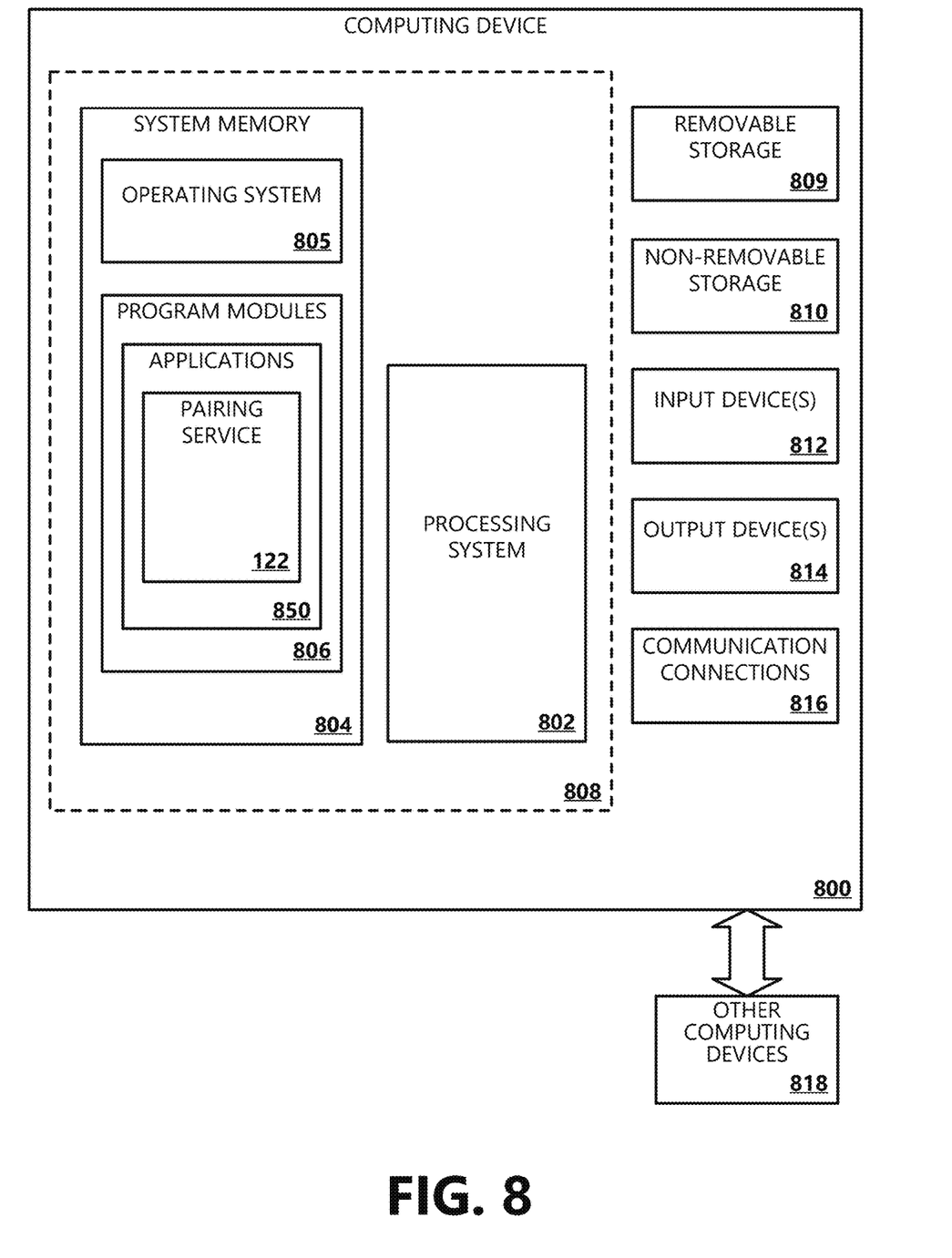
FIG. 8 is a block diagram illustrating example physical components of a computing device with which aspects of the disclosure may be practiced.

FIG. 1 is a block diagram of an example system 100 for providing coordinated set peripheral device pairing and connection management in accordance with aspects described herein. The example system as depicted is a combination of interdependent components that interact to form an integrated whole. Some components of the system are illustrative of software applications, systems, or modules that operate on a computing device or across a plurality of computer devices. Any suitable computer device(s) may be used, including web servers, application servers, network appliances, dedicated computer hardware devices, virtual server devices, personal computers, a system-on-a-chip (SOC), or any combination of these and/or other computing devices known in the art. In one example, components of systems disclosed herein are implemented on a single processing device. The processing device may provide an operating environment for software components to execute and utilize resources or facilities of such a system. An example of processing device(s) comprising such an operating environment is depicted in FIG. 8. In another example, the components of systems disclosed herein are distributed across multiple processing devices.

Among other components not shown, the system 100 includes a host device 102, one or more peripheral devices 104a and 104b (collectively, peripheral device 104), and a cloud peripheral device catalog service 106. The host device 102 is a computing device that can be represented by various types of computing devices, such as tablet computing devices, desktop computers, mobile communication devices, laptop computers, laptop/tablet hybrid computing devices, large screen multi-touch displays, vehicle computing systems, gaming devices, smart televisions, wearable devices, internet of things (IoT) devices, etc. The host device 102 and the cloud peripheral device catalog service 106 are connected by a network 108. The network 108 includes one or more local area networks (LANs) and/or wide area networks (WANs). In example implementations, a network includes the Internet, an intranet, and/or a cellular network, amongst any of a variety of possible public and/or private networks.

A number of components (e.g., a wireless communication platform 112, a pairing service 122, and a pairing broker 152) are operatively installed on the host device 102 to support wireless communication with and functionality of the peripheral device 104 using one or more standard wireless protocols. In an example implementation, the peripheral device 104 is a Bluetooth® enabled device, where the host device 102 and the peripheral device communicate using a wireless Bluetooth® protocol (e.g., Bluetooth® Low Energy (LE) Audio). As an example, the Bluetooth® LE Audio protocol uses an audio codec (e.g., Low Complexity Communication Codec (LC3)) to encode and decode signals, where the codec provides efficient transmission of audio using minimal computational power and battery power of the peripheral device 104. In an example implementation, the wireless communication protocol used by the host device 102 and peripheral device 104 supports multi-stream audio, which allows multiple audio streams to be broadcasted simultaneously. The concept of a Bluetooth® enabled device is provided as an example for illustrating concepts associated with embodiments of the present disclosure. Without departing from the scope, pairing and connection schemes described herein may be applied in the context of peripheral devices 104 configured for other types of wireless communication with the host device 102.

In some examples, the peripheral device 104 is a single peripheral device 134 comprising a single member of a set (herein referred to as a set member 124), such as a keyboard, mouse, camera, television, home appliance, automotive infotainment system, etc. In other examples, the peripheral device 104 is a coordinated set peripheral device 114 comprising at least two set members 124a-124n (collectively, set members 124). Examples of a coordinated set peripheral device 114 include a pair of hearing aids, a pair of earbuds, a speaker set, a group of sensor nodes (e.g., electrocardiogram (EKG) leads, tire pressure sensors), etc. The coordinated set peripheral device 114 is operative to receive multi-stream audio and react to control commands in a coordinated way (e.g., volume up and volume down). According to an aspect, in supporting multi-stream audio, each set member 124 of the coordinated set peripheral device 114 connects directly to the host device 102, which enables a stable and high-quality connection between the host device 102 and each set member 124.

In examples, the pairing service 122 is associated with (e.g., native to) an operating system implemented on the host device 102 that facilitates a pairing process and manages wireless connections between the host device 102 and a peripheral device 104. Pairing is an initial setup operation that allows the host device 102 and the peripheral device 104 to recognize and trust each other, thus enabling them to communicate securely. A secure connection is established for data transmission between the host device 102 and the peripheral device 104. According to an aspect, in a pairing process with a coordinated set peripheral device 114, the pairing service 122 connects individually to each set member 124 of the coordinated set peripheral device 114. According to another aspect, the pairing service 122 uses coordinated set knowledge from a peripheral device catalog (e.g., a local catalog 142 or a cloud catalog 116) to determine whether the peripheral device 104 is a coordinated set peripheral device 114. Based on the determination, one or more connect options 150 are presented.

The local catalog 142 is managed by a local peripheral device catalog service 132 operating on the host device 102 and the cloud catalog 116 is managed by the cloud peripheral device catalog service 106. In some examples, the local catalog 142 is a local cache or registry that stores non-personally identifiable make and model-specific peripheral device details 140 about peripheral devices 104 with which the host device 102 has previously paired and connected. In further examples, the cloud catalog 116 collects and stores peripheral device details 140 from a plurality of sources.

According to an aspect, peripheral device details 140 include information that indicates whether the peripheral device 104 is a coordinated set peripheral device 114. In some examples, peripheral device details 140 further include information that indicates a set size of a coordinated set peripheral device 114 (e.g., the number of set members 124 that are part of the coordinated set). In further examples, peripheral device details 140 include information that indicates whether the set size corresponds to a complete set or is a subset of a complete set (e.g., less than a complete set was previously detected and connected). The peripheral device details 140 are used by the pairing service 122 to present a multi-set member connect option for enabling connection to all or a subset of set members of an identified coordinated set peripheral device 114.

Example sources of peripheral device details 140 include the host device 102 and other host devices 120a-120n (collectively, other host devices 120 in communication with the cloud peripheral device catalog service 106). For instance, the host device 102 and/or other host devices 120 provide peripheral device details 140 about peripheral devices 104 with which they have previously paired and connected to the cloud peripheral device catalog service 106 to be written to the cloud catalog 116. In some examples, peripheral device details 140 stored in the local catalog 142 on the host device 102 are written to the cloud catalog 116. According to an aspect, peripheral device details 140 include information specific to a specific product (e.g., based on a make and model) of a peripheral device 104, where the "make" refers to an original equipment manufacturer (OEM) 130 of the peripheral device 104 and the "model" refers to a specific version or variant produced for a particular make. In some examples, the model is associated with a unique identifier or name that distinguishes it from other products by the same OEM 130. Another example source of peripheral device details 140 collected and written to the cloud catalog 116 includes one or more OEMs 130 of peripheral devices 104 that provide peripheral device details 140 about products made/manufactured by the OEMs 130. In some examples, the make and model of the peripheral device 104 are combined to form a unique key, which is used to store peripheral device details 140 related to the specific product (e.g., the peripheral device 104). The stored peripheral device details 140 are accessible to the pairing service 122 operating on the host device 102 or on another host device 120 when a same product (e.g., make and model-specific peripheral device 104) is being paired to the host device 102 or another host device 120.

According to an aspect, when the peripheral device 104 is determined as a coordinated set peripheral device 114 based on coordinated set knowledge stored in relation to the device, the presented connect option(s) 150 include a multi-member connect option corresponding to pairing and connecting to all discovered set members 124 of the coordinated set peripheral device 114. Selection of the multi-member connect option enables the host device 102 to connect multiple set members 124 via a single user interaction. In further examples, knowledge obtained from a catalog is further used to present product-specific cues during pairing and connection. The product-specific cues include make and model-specific information about the peripheral device 104 in the form of text, media, or another content type to reduce user confusion and enable the user to seamlessly and confidently select to pair and connect an intended peripheral device 104 and/or desired set members 124 of a coordinated set peripheral device 114 for a secure connection.

In some implementations, the pairing service 122 is associated with a specific pairing method. For instance, more than one pairing service 122 may be included for supporting different pairing methods. In other implementations, the pairing service 122 performs operations in association with a plurality of pairing methods. Example pairing methods include a selection to add a peripheral device 104 via a settings menu (e.g., accessible via navigating to a settings screen or settings configuration user interface of the peripheral device 104), a selection to add a peripheral device 104 via a quick settings menu (e.g., displayed as a dropdown or overlay accessible via a main screen or home screen), an automated method based on proximity of a peripheral device 104 to the host device 102, through an application or software interface, etc.

The pairing service 122 includes a user interface (UI) component 162 that presents information and/or options to a user in a UI and allows the user to provide information and/or select options during pairing, connection management, and/or after pairing a peripheral device 104 to the host device 102. In some examples, information and/or options are displayed on a screen 110 of the host device 102. In other examples, information and/or options are presented audibly via an output device (e.g., an audio speaker) of the host device 102. Example information and/or options presented to the user include one or more connect options 150, cues about a discovered, paired, or connected peripheral device 104, host device requirements for pairing (e.g., notification to enter a personal identification number (PIN) or code), and/or other information. Selection of a presented connect option 150 triggers pairing and connecting to selected set members of the peripheral device 104. Example information received from the user includes a selection of a connect option 150, the user's PIN or code, and/or other information.

The pairing service 122 further includes a pairing agent 172 that performs operations of a pairing method. In some examples, such as when the pairing service 122 is associated with a particular pairing method, the pairing service 122 includes a single pairing agent 172. In other examples, such as when the pairing service 122 performs operations in association with a plurality of pairing methods, the pairing service 122 includes a plurality of pairing agents 172. The pairing agent 172 is in communication with the pairing broker 152 and the wireless communication platform 112, where the wireless communication platform 112 includes a combination of physical interface(s) (e.g., a Bluetooth® radio or chip), software drivers, and application programing interface(s) (APIs) that allow the operating system and applications on the host device 102 to interact with the physical interface(s). In examples, the pairing broker 152 is communicatively connected to the wireless communication platform 112 and handles tasks related to managing and facilitating an exchange of information for establishment of a secure and authenticated connection between the host device 102 and the peripheral device 104 during the pairing process. Example information includes authentication data, encryption keys, pairing confirmation, security parameters, etc. The pairing agent 172 further communicates with the wireless communication platform 112 and handles tasks related to querying for information about the peripheral device 104, such as details about battery status, device capabilities, or other information that is not directly related to security and establishment of an initial connection.

The pairing service 122 further includes a catalog agent 182 that performs operations for reading and writing peripheral device details 140 from/to a catalog managed by a catalog service. In some implementations, the catalog agent 182 communicates with a plurality of catalogs including the local catalog 142 managed by the local peripheral device catalog service 132 and the cloud catalog 116 managed by the cloud peripheral device catalog service 106. In some examples, the catalog agent 182 writes peripheral device details 140 to the local catalog 142 and the cloud catalog 116 that are received in communications from the peripheral device 104. The communications may include advertisements broadcast by the peripheral device 104 (e.g., including a make and model of the peripheral device 104 and/or a display name) and communications exchanged between the host device 102 and the peripheral device 104 after connection. For instance, data is exchanged using a defined set of services and characteristics supported by the devices. One example defined service includes a coordinated set characteristic that is used to report whether the peripheral device 104 is a coordinated set peripheral device 114. Another example characteristic is a set member characteristic that is used to report a product or device identifier (ID) associated with other set members 124 in the coordinated set. Based on the device ID, the host device 102 is enabled to determine which of other discovered peripheral devices 104 are set members 124 of a coordinated set peripheral device 114. Based on the number of discovered peripheral devices 104, a set size is determined for the coordinated set peripheral device 114, which is included in peripheral device details 140 written to the local catalog 142 and cloud catalog 116. In other examples, another example characteristic is a set size characteristic that is used to report the set size of the coordinated set peripheral device 114. Another example characteristic is a complete set characteristic that is used to report whether the present set members 124 in the coordinated set peripheral device 114 is complete the set or are an incomplete set. For instance, if the coordinated set peripheral device 114 is a set of two earbuds (e.g., two set members 124) and only one earbud in the set is being paired (e.g., the second earbud may be missing, out of range, or low on battery), an indication the set is not complete is reported to the pairing service 122 by the complete set characteristic. In other examples, the catalog agent 182 reads peripheral device details 140 about the peripheral device 104 from the local catalog 142 or the cloud catalog 116. The peripheral device details 140 are used by the pairing service 122 to present UI elements to the user in association with the peripheral device 104 for providing a clear and seamless paring experience with the peripheral device 104.

Peripheral device details 140 may include additional product-specific information about the peripheral device 104 that can be used to provide additional UI elements. In some examples, peripheral device details 140 include a link to an image of the peripheral device 104, where the image is a make and model-specific image or icon of the peripheral device 104 (e.g., sourced by an OEM 130 of peripheral device 104). The image may include various visual features of the peripheral device 104 and is presented in a UI by the pairing service 122 to reduce user confusion for enabling the user to correctly select an intended peripheral device 104 and/or desired set member(s) 124 of a coordinated set peripheral device 114 for connection. In some examples, peripheral device details 140 include a link to a companion application or service associated with the peripheral device 104. For instance, the companion application may provide additional features or functionality for the peripheral device 104. As an example, if the peripheral device 104 includes a set of sensors, the application or service may analyze and/or present the data it collects to a user. According to an example implementation, after pairing a peripheral device 104 to the host device 102, the pairing service 122 presents a download/open option to download and/or open the associated companion application on the host device 102. Thus, a seamless pairing experience is provided. Although FIG. 1 is depicted as comprising a particular combination of computing environments, systems, and devices, the scale and structure of systems such as system 100 may vary and may include additional or fewer components than those described in FIG. 1.

Figure 2:
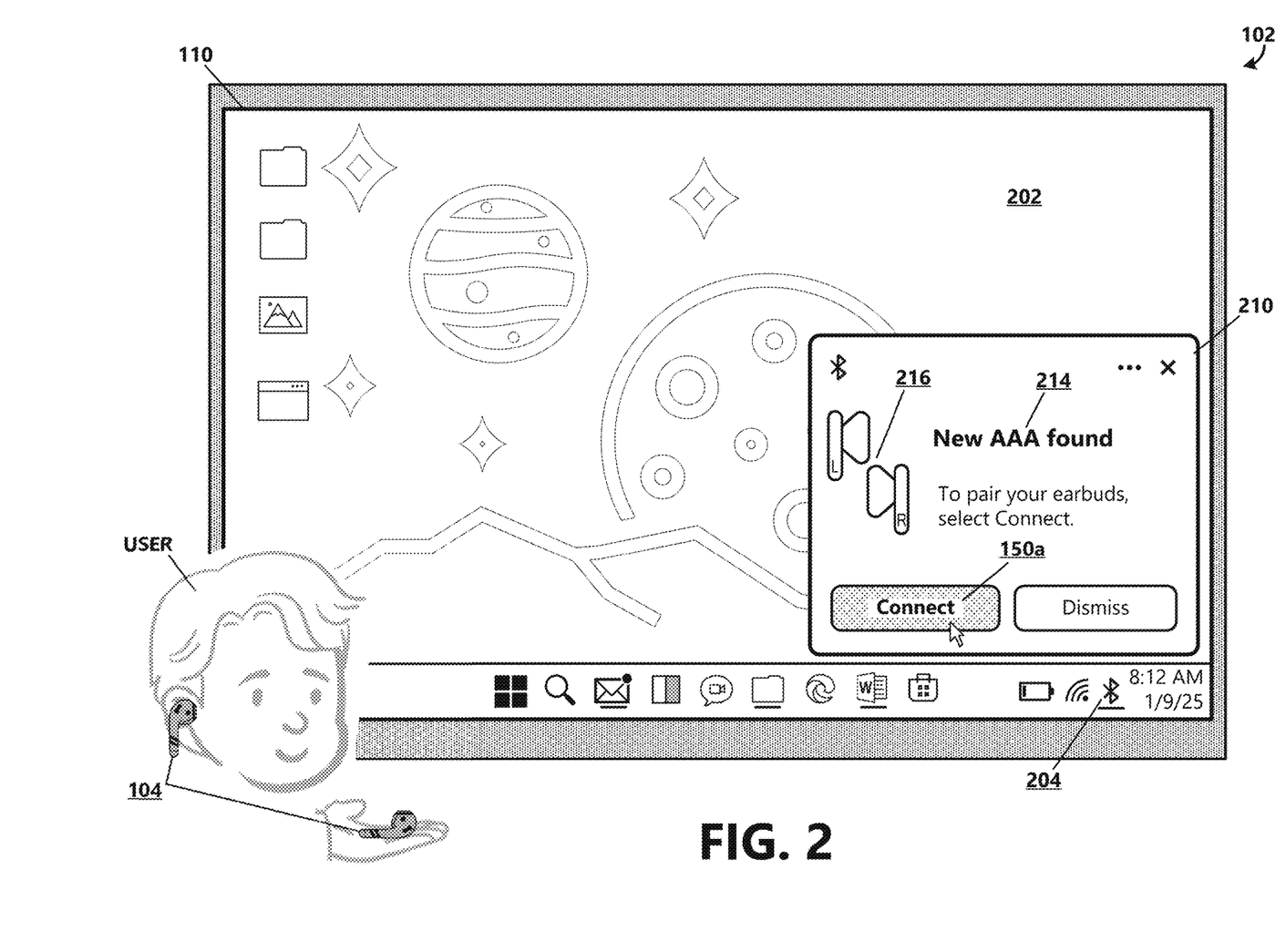
FIG. 2 is an illustration of example user interface elements according to a first example aspect.
Figure 3:
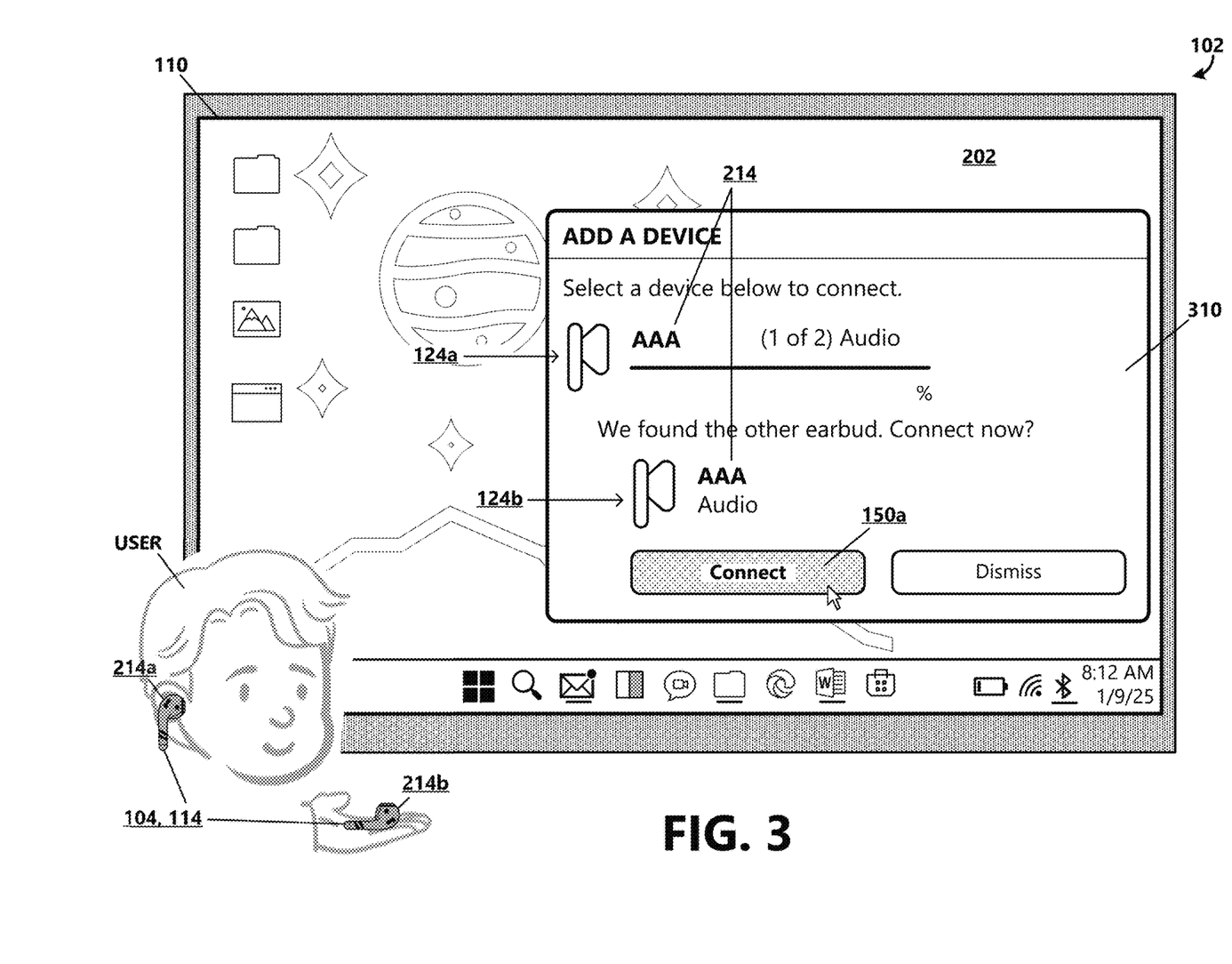
FIG. 3 is an illustration of example user interface elements according to a second example aspect.
Figure 4:
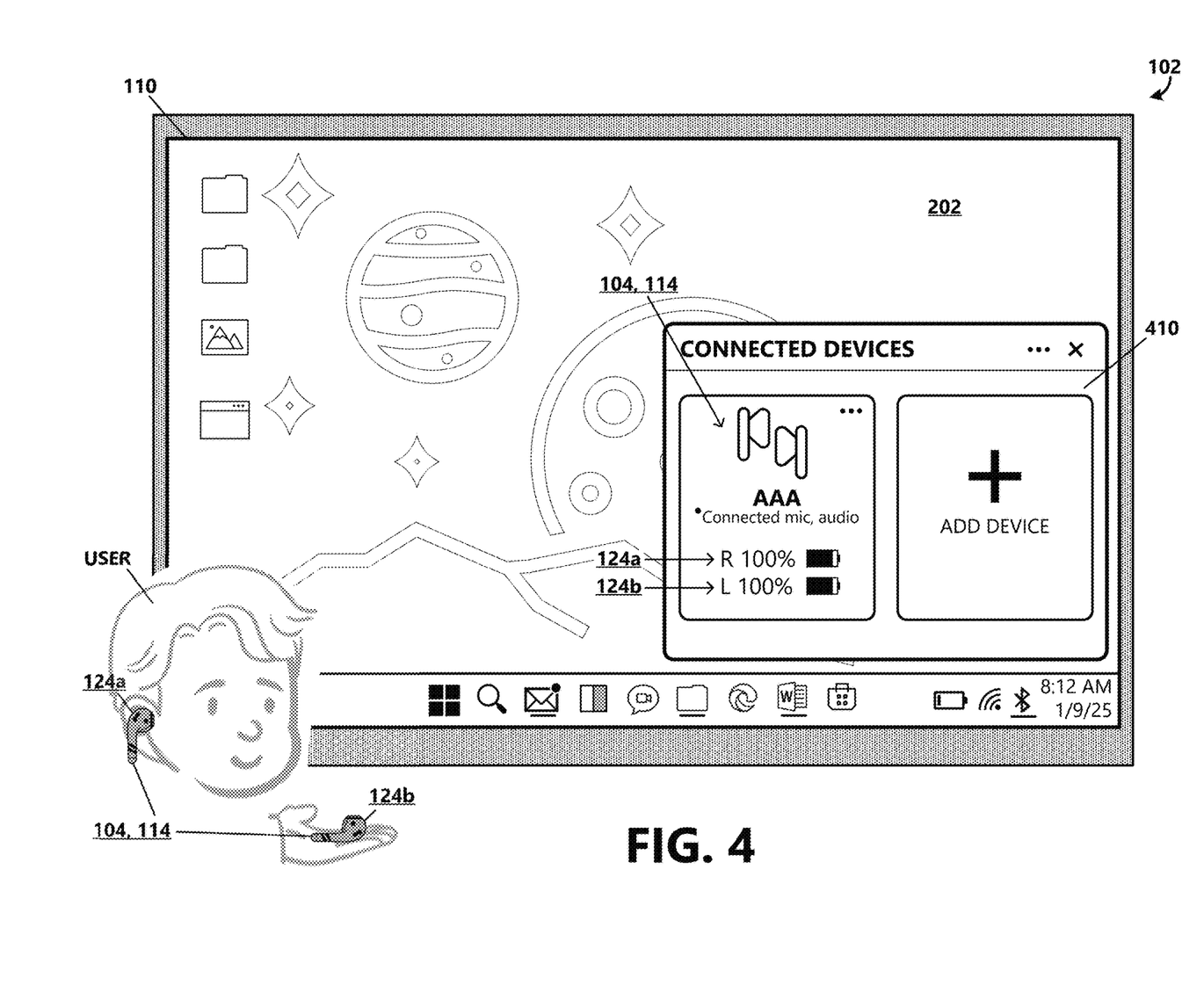
FIG. 4 is an illustration of example user interface elements according to a third example aspect.

FIGS. 2-4 depict example UIs including a variety of UI elements presented to a user of a host device 102 when pairing a peripheral device 104 to the host device 102 according to a first example aspect. The various UI elements may be presented as illustrated or provided in different combinations across various interfaces. FIGS. 2-4 depict one example method of the various methods that can be used to pair a peripheral device 104. With reference now to FIG. 2, a peripheral device 104 is detected by the host device 102, where the detected peripheral device 104 is in a pairing mode and in proximity to the host device 102. Proximity may be determined based on a wireless communication signal strength received from the peripheral device 104. Detection (e.g., discovery) of the peripheral device 104 may be performed automatically or in response to a selection to pair a new peripheral device 104 via an option presented in a settings menu, a quick settings menu (e.g., accessed via a quick settings icon 204), an application UI, or other presentation method. According to an example scenario, the detected peripheral device 104 has not been previously paired with the host device 102. Thus, the local catalog 142 does not include peripheral device details 140 associated with the detected peripheral device 104. Additionally, the detected peripheral device 104 has not been previously paired with another host device 120. Continuing further with the example scenario, the OEM 130 of the peripheral device 104 has not uploaded peripheral device details 140 associated with the detected peripheral device 104 to the cloud catalog 116. Thus, the cloud catalog 116 does not include peripheral device details 140 associated with the detected peripheral device 104.

According to an example and as depicted in FIG. 2, various UI elements are presented in a first example UI 210. The first example UI 210 is displayed on a desktop 202 on a screen 110 of the host device 102 and includes information associated with the detected peripheral device 104 and a single connect option 150a. In examples, two peripheral devices 104 are discovered. At this point, the host device 102 is not aware of whether the two discovered devices are two set members 124 of a coordinated set peripheral device 114 or two separate peripheral devices. One of the two discovered peripheral devices 104 is filtered out and the other device is presented in the first example UI 210 with the single connect option 150a. The detected peripheral device 104 is represented by a display name 214 defined in advertisements received from the peripheral device 104 or based on a defined class of device (COD). In some examples, the peripheral device 104 is further represented by a visual representation 216 of the device. The visual representation 216 may be an icon mapped to the CoD, if included in advertisements, or a default icon. When the single connect option 150a is selected, consent is given to allow the discovered peripheral device 104 to pair with the host device 102. The host device 102 then proceeds to pair and connect to the peripheral device 104.

With reference now to FIG. 3 and continuing with the example scenario, the host device 102 determines the peripheral device 104 is a first set member 124a of a coordinated set peripheral device 114 based on information received in communications exchanged with the peripheral device 104 after connecting to the peripheral device 104. The communications may include a device ID of a second set member 124b of the coordinated set. For instance, when the host device 102 connects to the first set member 124a, various UI elements are presented in a second example UI 310. In some examples, the second example UI 310 informs the user of a connection status of the first set member 124a of the coordinated set peripheral device 114. Additionally, the second example UI 310 notifies the user of the additional discovered peripheral device (i.e., the second set member 124b) and presents another single connect option 150a associated with the second set member 124b. When the single connect option 150a is selected, consent is given to allow the second set member 124b to pair with the host device 102. The host device 102 then proceeds to pair and connect to the second set member 124b. Otherwise, the host device 102 will not pair and connect to second set member 124b. According to examples, it may be difficult to identify if set members 124 are part of a same coordinated set peripheral device 114. Thus, for increased security, the second single connect option 150a is presented to first verify the second set member 124b is indeed part of the same coordinated set peripheral device 114 as the first set member 124a before connecting. According to an example, the second single connect option 150a is selected by the user.

With reference now to FIG. 4, upon completion of pairing and connecting to the discovered set members 124 of the coordinated set peripheral device 114, a third example UI 410 is presented. The third example UI 410 presents connected devices. For instance, the first set member 124a and the second set member 124b are each individually connected devices, which may be presented in the third example UI 410 as part of or in relation to the coordinated set peripheral device 114. Additional information about each set member 124 obtained from communications with the set members 124 may be included, such as each device's remaining battery life, a spatial configuration of each device within the set, etc.

According to examples, the host device 102 writes peripheral device details 140 associated with the connected coordinated set peripheral device 114 to the local catalog 142, which are further uploaded to the cloud catalog 116. In some implementations, peripheral device details 140 are uploaded to the cloud catalog 116 when the details are written to the local catalog 142. In other implementations, peripheral device details 140 are uploaded to the cloud catalog 116 periodically or at predetermined intervals. In examples, the peripheral device details 140 are stored in association with a product identifier (e.g., a key derived from the make and model) of the coordinated set peripheral device 114. The peripheral device details 140 include an indication about whether the device is a coordinated set peripheral device 114, the set size (e.g., 2) and an indication of whether the number of set members indicated in the set size is based on information obtained from a complete set. For instance, if only one set member 124 was discovered and connected to the host device 102, the peripheral device details 140 written to the local catalog 142 and the cloud catalog 116 may indicate the set is not complete, and thus, the set size value represents a minimum set size.

Accordingly, when the host device 102 or another host device 120 attempts to pair to a new peripheral device 104 that is the same make and model as the coordinated set peripheral device 114 connected to the host device 102 in FIGS. 2-4, the peripheral device details 140 provide the host device 102 knowledge about whether the new peripheral device 104 is a coordinated set peripheral device 114 and the set size or minimum set size. This coordinated set knowledge is used by the host device 102 or other host device 120 in advance of presenting a connect option 150. Thus, a determination is made based on the read peripheral device details 140 as to whether to present a multi-member connect option for connecting discovered set members 124 of the coordinated set peripheral device 114 via a simplified (e.g., single) user interaction.

In some examples, the OEM 130 of the coordinated set peripheral device 114 provides additional peripheral device details 140 to the cloud catalog 116 to store in association with the coordinated set peripheral device 114, such as links to a make and model-specific image file (or link to the image file), a companion application or service associated with the coordinated set peripheral device 114, etc. For instance, the additional peripheral device details 140 allow the host device to display a make and model-specific image with a connect option 150 to provide further information to the user for reducing confusion.

Figure 5:
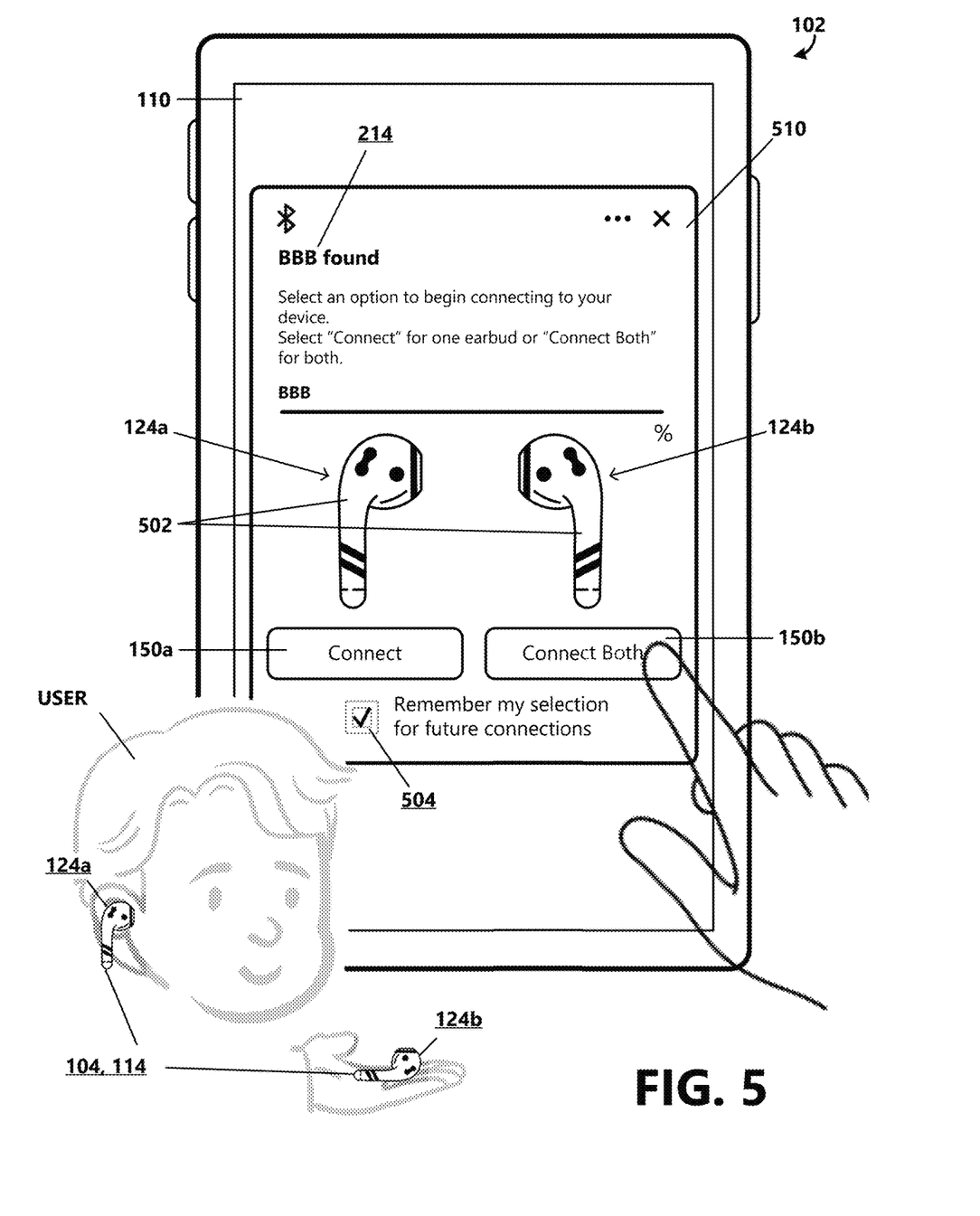
FIG. 5 is an illustration of example user interface elements according to a fourth example aspect.
Figure 6:
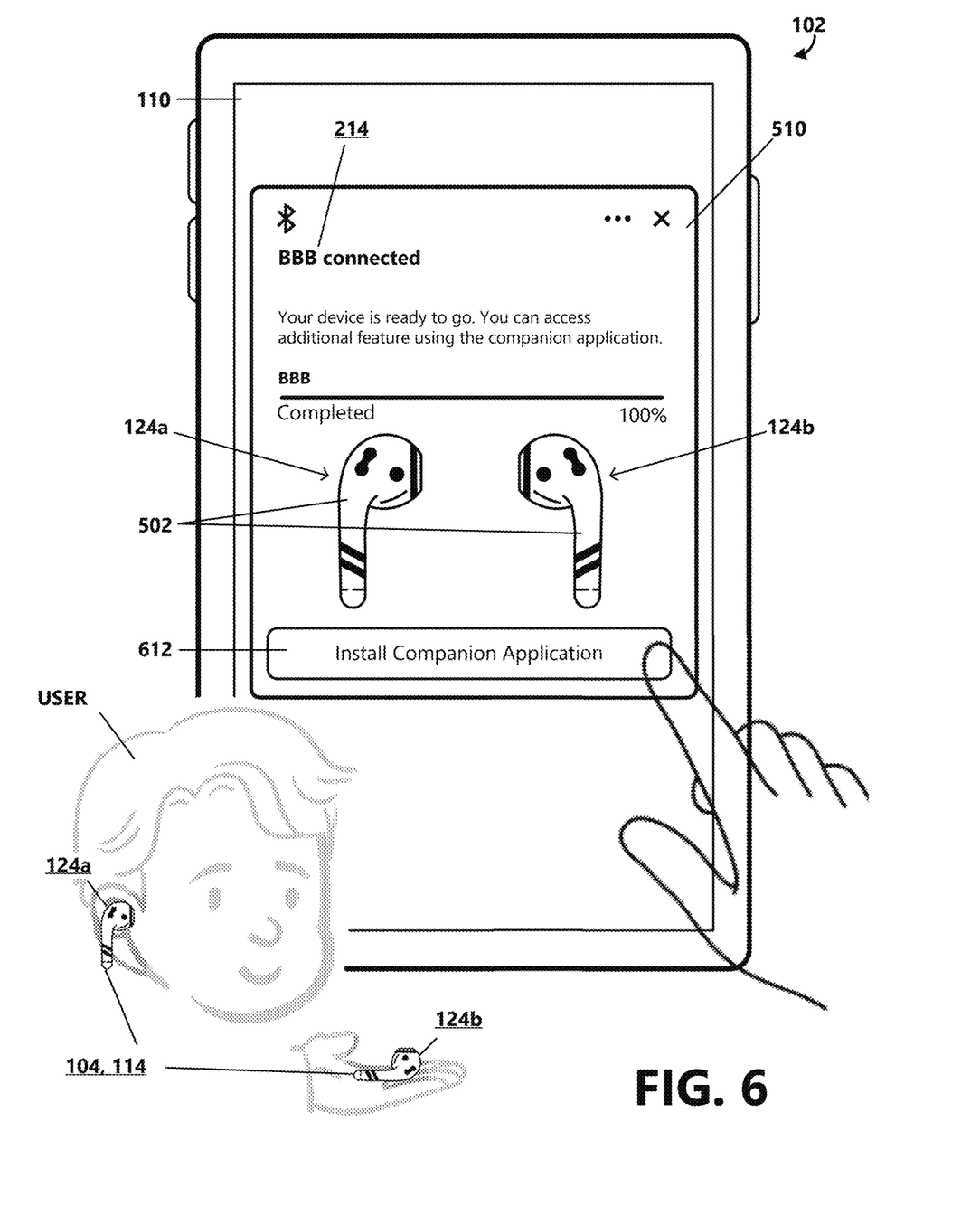
FIG. 6 is an illustration of example user interface elements according to a fifth example aspect.

FIGS. 5-6 depict a variety of UI elements presented via a host device 102 in one or more example UIs when pairing another peripheral device 104 to the host device 102 according to a second example aspect. The various UI elements may be presented as illustrated or provided in different combinations across various interfaces. FIGS. 5-6 depict one example method of the various methods that can be used to pair a peripheral device 104. With reference now to FIG. 5, a peripheral device 104 is discovered by the host device 102, where the discovered peripheral device 104 is in a pairing mode and in proximity to the host device 102. Detection (e.g., discovery) of the peripheral device 104 may be performed automatically or in response to a user selection to pair a new peripheral device 104 via an option presented in a settings menu, a quick settings menu, an application UI, or other presentation method.

Upon detection of the peripheral device 104, the local catalog 142 is queried for product-specific peripheral device details 140 associated with the make and model of the discovered peripheral device 104. According to an example scenario, the discovered peripheral device 104 has not been previously paired with the host device 102. Thus, the local catalog 142 does not include peripheral device details 140 associated with the discovered peripheral device 104 and the cloud catalog 116 is queried for make and model-specific peripheral device details 140. According to the example scenario, the discovered peripheral device 104 has been previously paired with another host device 120 and/or the OEM 130 of the peripheral device 104 has provided peripheral device details 140 associated with the discovered peripheral device 104 to the cloud peripheral device catalog service 106. Thus, in the example scenario, the cloud catalog 116 includes make and model-specific peripheral device details 140 associated with the discovered peripheral device 104. The catalog agent 182 of the pairing service 122 operating on the host device 102 reads the peripheral device details 140 from the cloud catalog 116 via the cloud peripheral device catalog service 106.

The peripheral device details 140 read by the pairing service 122 indicate the discovered peripheral device 104 is a set member 124 (e.g., a first set member 124a) of a coordinated set peripheral device 114 and the set size (e.g., two set members 124). Accordingly, the pairing service 122 determines one or more connect options 150 to present for connecting to one or more set members 124 of the coordinated set peripheral device 114.

According to an example, and as depicted in FIG. 5, a fourth example UI 510 is displayed on the screen 110 of the host device 102 including the determined connect options 150. Based on the set size (e.g., two), a determination may be made to present a single connect option 150*a* to connect to the first set member 124*a* and a multi-member connect option 150*b* to connect to both (e.g., all detected) set members 124 of the coordinated set peripheral device 114. For instance, the multi-member connect option 150*b* may enable the user to consent to connect to both set members 124*a* and 124*b* via a single interaction. In some implementations, and as illustrated in FIG. 5, the multi-member connect option 150*b* includes a text label that communicates the action that is performed when the multi-member connect option 150*b* is selected (e.g., "Connect Both"). In some examples, a save option 504 is provided that allows a selection to allow the pairing service 122 to remember the user's connect option selection for future connections. In further examples, when the user's connect option selection is saved, the next time both set members 124 of the coordinated set peripheral device 114 are within proximity to and discovered by the host device 102, the pairing service 122 presents the multi-member connect option 150*b*. When the multi-member connect option 150*b* is selected, the pairing service 122 triggers pairing to both set members 124.

Continuing with the example scenario, peripheral device details 140 are provided to the cloud catalog 116 by the OEM 130 of the coordinated set peripheral device 114, where the peripheral device details 140 include a link to a product-specific image 502 of the coordinated set peripheral device 114. The link is used by the pairing service 122 to obtain the product-specific image 502, which is displayed in the fourth example UI 510. In some examples, the product-specific image 502 is an actual image of the associated peripheral device 104 (e.g., a catalog image, a photograph, or graphical rendering of the peripheral device showing visual details of the peripheral device). The product-specific image 502 is provided to give additional information about the detected devices for which the connect options are presented. For instance, the additional information may reduce confusion and assist in ensuring the correct devices are paired and connected to the host device 102.

Continuing further with the example scenario, peripheral device details 140 provided to the cloud catalog 116 by the OEM 130 of the coordinated set peripheral device 114 further include a link to a companion application of the coordinated set peripheral device 114. In examples, after pairing is complete and the host device 102 is connected to all set members 124, the pairing service 122 associates the link with an installation option 612, which is displayed in a fifth example UI 610 depicted in FIG. 6. Selection of the installation option 612 triggers the pairing service 122 to download and install the companion application. Accordingly, a clear and simplified user experience is provided for pairing the new coordinated set peripheral device 114.

Figure 7:
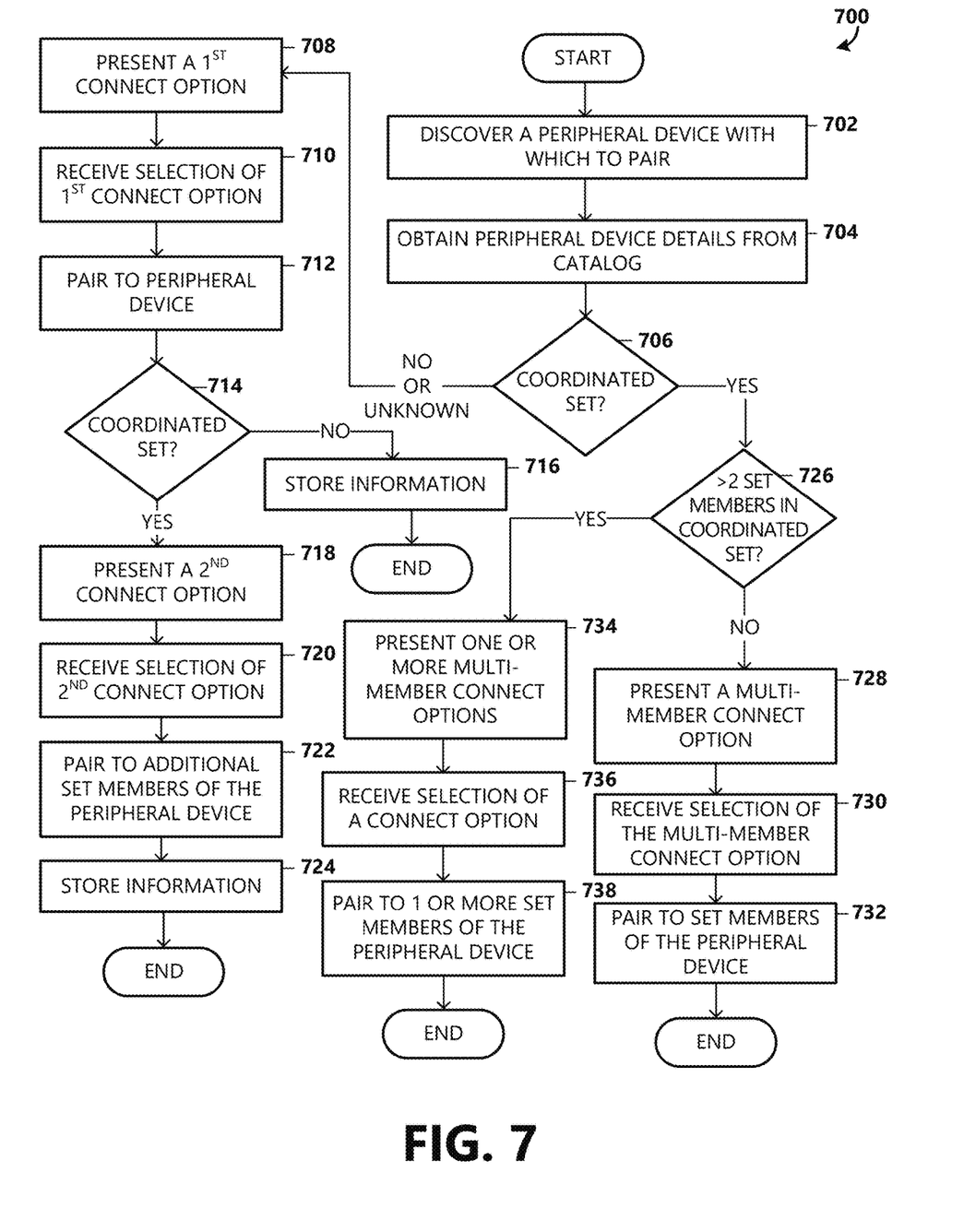
FIG. 7 is a flow diagram depicting an example method of providing coordinated set peripheral device pairing and connection management according to an aspect.

With reference now to FIG. 7, a flowchart of a method 700 for providing coordinated set peripheral device pairing and connection management is depicted according to an example. The operations of the method 700 are performed by one or more components or computing devices, such as by components of the pairing service 122 of a host device 102. According to examples, the method 700 starts when an indication to initiate wireless communication (e.g., Bluetooth®) pairing is received and a pairing process is initiated on the host device 102. In some examples, pairing is initiated based on a selection of an option to add or pair a new peripheral device 104 from a settings menu, a quick settings menu, or an application, which triggers the host device 102 to enter an inquiry mode. In the inquiry mode, the host device 102 scans for nearby discoverable peripheral devices 104. When a peripheral device 104 is discoverable, the peripheral device 104 is in a pairing or discovery mode, where it broadcasts its presence to other devices in advertisements at one or more cadences. In other examples, the host device 102 automatically scans for nearby discoverable peripheral devices 104. At operation 702, a first peripheral device 104 is discovered, and thus, advertisements broadcast by the first peripheral device 104 are read by the pairing service 122 on the host device 102. In some implementations, the advertisements are received by the wireless communication platform 112 and provided to the pairing agent 172 of the pairing service 122 via the pairing broker 152. The advertisements include information about the device's identity, services, and characteristics (e.g., a device identifier (ID), a device or model name, a display name, device capabilities, manufacturer (OEM) data, service identifiers (universally unique identifiers (UUIDs))). In some examples, the display name includes the OEM 130 (e.g., make or brand), trademark, model name, and/or model number of the peripheral device 104.

At operation 704, the local catalog 142 is queried to determine whether the discovered/detected peripheral device 104 is a product known by the host device 102. For instance, the catalog agent 182 uses make and model information about the peripheral device 104 received in advertisements to query the local catalog 142 for stored peripheral device details 140. When the peripheral device 104 has been previously paired and connected to the host device 102 and peripheral device details 140 are stored in the local catalog 142, the peripheral device details 140 for the peripheral device 104 are retrieved and read by the catalog agent 182. In other cases, when the peripheral device 104 is not known by the host device 102, the catalog agent 182 queries the cloud catalog 116 for peripheral device details 140 stored in the cloud catalog 116 related to the specific make/model of the peripheral device 104.

At decision operation 706, a determination is made as to whether peripheral device details 140 are stored for the peripheral device 104 and, if so, whether the peripheral device details 140 indicate the discovered peripheral device 104 is a coordinated set peripheral device 114. In a first example, peripheral device details 140 read from the local catalog 142 or the cloud catalog 116 indicate the discovered peripheral device 104 is a single peripheral device 134 that is comprised of a single set member 124. In a second example, it may be a first time a device of the particular make and model as the discovered peripheral device 104 has been connected to a host device 102 or other host device 120 within the operating environment. Further, the OEM 130 of the device has not uploaded peripheral device details 140 to the cloud catalog 116. Thus, in the second example, no peripheral device details 140 associated with the discovered peripheral device 104 are stored by the cloud catalog 116. In both examples, a determination is made to pair the discovered peripheral device 104 as a single peripheral device 134 and the method 700 proceeds to operation 708. In a third example, peripheral device details 140 related to the discovered peripheral device 104 are read from the local catalog 142 or the cloud catalog 116, which indicate the discovered peripheral device 104 is a coordinated set peripheral device 114. The method 700 then proceeds to decision operation 726 (described below).

Continuing with the first and second examples, the pairing process for a single device continues, where, at operation

708, a first single connect option 150*a* corresponding to the discovered peripheral device 104 is presented (e.g., via the host device 102). In examples, selection of the first single connect option 150*a* is received at operation 710, which indicates consent to connect to the discovered peripheral device 104 is received and trigger pairing the device as a single set member 124 at operation 712.

Additional peripheral device details 140 are received in communications exchanged with the discovered peripheral device 104 during pairing. At decision operation 714, a determination is made at as to whether the discovered peripheral device 104 is a set member 124 of a coordinated set peripheral device 114. For instance, when connected to the host device 102, the discovered peripheral device 104 is prompted for peripheral device details 140 that indicate whether it is part of a coordinated set. When peripheral device details 140 indicate it is not a coordinated set peripheral device 114, at operation 716, the host device 102 completes pairing the peripheral device 104 and peripheral device details 140 are written to the local catalog 142 in association with the make and model of the peripheral device 104. The peripheral device details 140 are additionally written to the cloud catalog 116.

Otherwise, when peripheral device details 140 indicate the peripheral device 104 is part of a coordinated set at operation 714, a determination is made that the peripheral device 104 is a coordinated set peripheral device 114 and the peripheral device 104 is prompted for additional peripheral device details 140 that allow the host device 102 to identify other discovered devices as members of the same coordinated set. For instance, the host device 102 requests and receives a device ID associated with other set members 124 in the coordinated set. Based on the device ID, the host device 102 determines which of other discovered peripheral devices 104 are set members 124 of the same coordinated set peripheral device 114.

Continuing to operation 718, a second single connect option 150*a* and/or a multi-member connect option 150*b* is presented for connecting one or more additional set member(s) 124 determined as part of the coordinated set peripheral device 114. At operation 720, the second single connect option 150*a* or the multi-member connect option 150*b* is selected, providing consent to pair and connect with the corresponding additional set member(s) 124. The additional set member(s) 124 are paired and connected to the host device 102 at operation 722. At operation 724, peripheral device details 140 are written to the local catalog 142. In examples, the peripheral device details 140 are stored based on a product identifier and include an indication that the device is a coordinated set peripheral device 114. The peripheral device details 140 further include an indication of the number of set members 124 that are part of the coordinated set (e.g., the set size). Additionally, the peripheral device details 140 are written to the cloud catalog 116. In some examples, the peripheral device details 140 further include an indication of whether the coordinated set is complete (e.g., whether there are additional set members 124 that are part of the set that were not discovered) and connected to the host device 102 (e.g., based on information provided by the first set member 124 of the coordinated set peripheral device 114 in response to a prompt for a complete set characteristic). The method 700 may end after operation 724.

With reference again to decision operation 706, based on coordinated set knowledge obtained from the local catalog 142 or the cloud catalog 116, a determination is made that the discovered peripheral device 104 is a first set member 124 of a coordinated set peripheral device 114. The method 700 then proceeds to decision operation 726 where a determination is made as to whether the set size of the coordinated set peripheral device 114 is two or greater than two. When the peripheral device details 140 indicate the coordinated set peripheral device 114 has two set members 124, the method 700 proceeds to operation 728, where a multi-member connect option 150*b* is presented to connect to both set members 124 of the coordinated set peripheral device 114. In some examples, the multi-member connect option 150*b* includes a "Connect Both" text label to indicate the action performed when the multi-member connect option 150*b* is selected. In some examples, one or more product-specific cues are also presented, such as a product-specific image 502 of the coordinated set peripheral device 114. The multi-member connect option 150*b* is selected at operation 730, and the pairing service 122 completes pairing and connecting to both set members 124 of the coordinated set peripheral device 114 at operation 732. In some examples, a download/open option 612 corresponding to a companion application of the coordinated set peripheral device 114 is presented, which when selected, downloads or opens the companion application for supporting functionality of the coordinated set peripheral device 114. The method 700 may end after operation 732.

With reference again to decision operation 726, when the peripheral device details 140 indicate the coordinated set peripheral device 114 has more than two discovered set members 124, the method 700 proceeds to operation 734, where one or more multi-member connect options 150*b* are presented to connect to all or a subset of set members 124 of the coordinated set peripheral device 114. In some examples, one or more product-specific cues are also presented, such as a product-specific image 502 of the coordinated set peripheral device 114. One of the presented multi-member connect options 150*b* is selected at operation 736, and the pairing service 122 completes pairing and connecting to corresponding set members 124 of the coordinated set peripheral device 114 at operation 738. In some examples, a download/open option 612 corresponding to a companion application of the coordinated set peripheral device 114 is presented, which when selected, downloads or opens the companion application for supporting functionality of the coordinated set peripheral device 114. The method 700 may end after operation 732.

FIG. 8 and the associated description provide a discussion of a variety of operating environments in which examples of the invention may be practiced. However, the devices and systems illustrated and discussed with respect to FIG. 8 is for purposes of example and illustration and is not limiting of a vast number of computing device configurations that may be utilized for practicing aspects of the invention, described herein. FIG. 8 is a block diagram illustrating physical components (i.e., hardware) of a computing device 800 with which examples of the present disclosure may be practiced. In a basic configuration, the computing device 800 may include a processing system 802 and a system memory 804. The processing system includes at least one processing unit (e.g., processor). Depending on the configuration and type of computing device, the system memory 804 may comprise volatile storage (e.g., random access memory), non-volatile storage (e.g., read-only memory), flash memory, or any combination of such memories. The system memory 804 may include an operating system 805 and one or more program modules 806 suitable for running software applications 850 (e.g., the pairing service 122).

The operating system 805, for example, may be suitable for controlling the operation of the computing device 800. Furthermore, aspects of the invention may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, or optical disks. Such additional storage is illustrated in FIG. 8 by a removable storage device 809 and a non-removable storage device 810.

As stated above, a number of program modules and data files may be stored in the system memory 804. While executing on the processing system 802, the program modules 806 may perform processes including one or more of the operations of the methods illustrated in FIG. 7. Other program modules that may be used in accordance with examples of the present invention and may include applications such as electronic mail and contacts applications, word processing applications, spreadsheet applications, database applications, slide presentation applications, drawing or computer-aided application programs, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to generating suggested queries, may be operated via application-specific logic integrated with other components of the computing device 800 on the single integrated circuit (chip). Examples of the present disclosure may also be practiced using other technologies capable of performing logical operations such as, for example, AND, OR, and NOT, including mechanical, optical, fluidic, and quantum technologies.

The computing device 800 may also have one or more input device(s) 812 such as a keyboard, a mouse, a pen, a sound input device, a touch input device, etc. The output device(s) 814 such as a display, speakers, a printer, etc. may also be included. The aforementioned devices are examples and others may be used. The computing device 800 may include one or more communication connections 816 allowing communications with other computing devices 818. Examples of suitable communication connections 816 include RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (i.e., memory storage.) Computer storage media may include random access memory (RAM), read-only memory (ROM), electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, communication media may include wired media such as a wired network or direct-wired connection, and wireless media such as acoustic, radio frequency (RF), infrared, and other wireless media.

According to an aspect, a computing system is provided, comprising: a processing system; and memory storing instructions that, when executed, cause the computing system to: discover, by a host device, a peripheral device with which to pair; receive, from the peripheral device, a product identifier of the peripheral device; obtain details related to the peripheral device from a catalog based on the product identifier, wherein the details include an indication the peripheral device is a first set member of a coordinated set; present, by the host device, a multi-member connect option to connect to all set members in the coordinated set; receive a selection of the multi-member connect option; and connect to the first set member and to an additional set member in the coordinated set.

According to another aspect, a method for pairing a peripheral device is provided, comprising: discovering, by a host device, a first peripheral device with which to pair; receiving, from the first peripheral device, a product identifier of the first peripheral device; querying a catalog based on the product identifier for details associated with the first peripheral device; determining the catalog does not include the details; presenting a first connect option on the host device to connect the first peripheral device; receiving a first selection of the first connect option; connecting to the first peripheral device; receiving the details from the first peripheral device, where the details indicate the first peripheral device is a first set member of a coordinated set; presenting a second connect option on the host device to connect to a second set member of the coordinated set; receiving a second selection of the second connect option; connecting to the second set member; and storing the details in the catalog in association with the product identifier.

According to another aspect, a method for pairing a peripheral device is provided, comprising: discovering, by a host device, a peripheral device with which to pair; receiving, from the peripheral device, a product identifier of the peripheral device; obtaining details related to the peripheral device based on the product identifier; determining, based on the details, the peripheral device is a first set member of a coordinated set; presenting a multi-member connect option on the host device to connect to all set members in the coordinated set; receiving a selection of the multi-member connect option; and separately connecting to all set members in the coordinated set.

Aspects of the present invention, for example, are described above with reference to block diagrams and/or operational illustrations of methods, systems, and computer program products according to aspects of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. Further, as used herein and in the claims, the phrase "at least one of element A, element B, or element C" is intended to convey any of: element A, element B, element C, elements A and B, elements A and C, elements B and C, and elements A, B, and C.

The description and illustration of one or more examples provided in this application are not intended to limit or restrict the scope of the invention as claimed in any way. The aspects, examples, and details provided in this application are considered sufficient to convey possession and enable others to make and use the best mode of claimed invention. The claimed invention should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope of the claimed invention.

We claim:

1. A computing system, comprising:
a processing system; and
memory storing instructions that, when executed, cause the computing system to:
discover, by a host device, a peripheral device with which to pair;
receive, from the peripheral device, a product identifier of the peripheral device;
obtain details related to the peripheral device from a catalog based on the product identifier, wherein the details include an indication the peripheral device is a first set member of a coordinated set;
present, by the host device, a multi-member connect option to connect to all set members in the coordinated set;
receive a selection of the multi-member connect option; and
connect to the first set member and to an additional set member in the coordinated set.

2. The system of claim 1, wherein the details further include an indication of a set size of the coordinated set.

3. The system of claim 2, wherein:
the set size includes two set members; and
the multi-member connect option comprises an option to connect to both set members.

4. The system of claim 1, wherein the catalog is a local catalog on the host device storing the details in association with the product identifier.

5. The system of claim 4, wherein the details correspond to a previously paired peripheral device previously connected to the host device and having a same product identifier.

6. The system of claim 1, wherein the catalog is a cloud catalog storing the details in association with the product identifier.

7. The system of claim 6, wherein:
the details correspond to at least one of:
a previously paired peripheral device previously connected to the host device or another host device and having the product identifier; or
information provided by an original equipment manufacturer of the peripheral device.

8. The system of claim 1, wherein:
the details include a link to an image of the peripheral device; and
the instructions further cause the system to:
obtain the image; and
present the image with the multi-member connect option.

9. The system of claim 1, wherein:
the details include a link to a companion application; and
the instructions further cause the system to present the link to the companion application after connecting to the first set member and to an additional discovered set member in the coordinated set.

10. A method for pairing a peripheral device, comprising:
discovering, by a host device, a first peripheral device with which to pair;
receiving, from the first peripheral device, a product identifier of the first peripheral device;
querying a catalog based on the product identifier for details associated with the first peripheral device;
determining the catalog does not include the details;
presenting a first connect option on the host device to connect the first peripheral device;
receiving a first selection of the first connect option;
connecting to the first peripheral device;
receiving the details from the first peripheral device, where the details indicate the first peripheral device is a first set member of a coordinated set;
presenting a second connect option on the host device to connect to a second set member of the coordinated set;
receiving a second selection of the second connect option;
connecting to the second set member; and
storing the details in the catalog in association with the product identifier.

11. The method of claim 10, wherein storing the details in the catalog comprises:
storing the details in a local catalog on the host device; and
uploading the details to a cloud catalog service for storage in a cloud catalog.

12. The method of claim 10, wherein the details further indicate a set size of the coordinated set.

13. The method of claim 12, wherein the details further indicate whether the set size is a complete set or an incomplete set.

14. A method for pairing a peripheral device, comprising:
discovering, by a host device, a peripheral device with which to pair;
receiving, from the peripheral device, a product identifier of the peripheral device;
obtaining details related to the peripheral device from a catalog based on the product identifier, wherein the details include an indication the peripheral device is a first set member of a coordinated set;
presenting a multi-member connect option on the host device to connect to all set members in the coordinated set;

receiving a selection of the multi-member connect option; and separately connecting to all set members in the coordinated set.

15. The method of claim 14, further comprising:

determining, based on the details, a set size of the coordinated set; and determining the multi-member connect option to present based on the set size.

16. The method of claim 15, wherein:

the set size includes at least two set members; and the multi-member connect option comprises an option to connect to the at least two set members.

17. The method of claim 14, wherein;

the details correspond to a previously paired peripheral device previously connected to the host device and having a same product identifier.

18. The method of claim 14, wherein:

the details correspond to at least one of:

a previously paired peripheral device previously connected to the host device or another host device and having the product identifier; or information provided by an original equipment manufacturer of the peripheral device.

19. The method of claim 14, further comprising:

obtaining a link to an image of the peripheral device; and presenting the image with the multi-member connect option.

20. The method of claim 14, further comprising:

obtaining a link to a companion application of the peripheral device; and presenting the link to the companion application after connecting to at least one set member in the coordinated set.

* * * * *